United States Patent [19]

Hirsch

[11] 4,305,982
[45] Dec. 15, 1981

[54] SHATTERPROOF INSULATING LAMINATE

[76] Inventor: Elisabeth Hirsch, Pleyergasse 6, A 2700 Wiener Neustadt, Austria

[21] Appl. No.: 164,087

[22] Filed: Jun. 30, 1980

[51] Int. Cl.³ .............................. F06B 3/24; B32B 3/20
[52] U.S. Cl. ....................................... 428/34; 428/72; 428/116; 428/119; 428/166; 428/167; 428/188; 428/412; 428/429
[58] Field of Search ................ 428/34, 167, 188, 189, 428/116, 119, 137, 138, 178, 166, 72, 429, 412

[56] References Cited
U.S. PATENT DOCUMENTS

| | | | |
|---|---|---|---|
| 2,695,430 | 11/1954 | Wakefield | 428/34 |
| 4,046,951 | 9/1977 | Stefanik | 428/189 |
| 4,204,015 | 5/1980 | Wardlaw | 428/34 |

FOREIGN PATENT DOCUMENTS

| | | | |
|---|---|---|---|
| 1659688 | 10/1969 | Fed. Rep. of Germany | 428/34 |
| 1921624 | 11/1970 | Fed. Rep. of Germany | 428/34 |

*Primary Examiner*—Ellis P. Robinson
*Attorney, Agent, or Firm*—Karl F. Ross

[57] ABSTRACT

A laminate particularly usable for a greenhouse or as a skylight has a glass sheet to one side of which is bonded a synthetic-resin panel formed by inner and outer synthetic-resin plates that extend parallel to but are spaced from each other by a plurality of transverse synthetic-resin webs that unitarily interconnect and space the plates and form between them a plurality of dead-air spaces. The inner plate is bonded to the face of the glass sheet, and the dead-air spaces are sealed at the periphery of the laminate.

9 Claims, 3 Drawing Figures

SHATTERPROOF INSULATING LAMINATE

FIELD OF THE INVENTION

The present invention relates to a laminate. More particularly this invention concerns an at least semi-transparent glass-type laminate of the shatterproof and insulating type.

BACKGROUND OF THE INVENTION

The most common type of shatterproof laminate simply comprises a pair of glass sheets sandwiching a synthetic-resin layer that is bonded flatly to the sheets to both sides of it. The sheets are transparent so that the laminate has the external hardness and appearance of a sheet of solid glass. Nonetheless if this laminate is cracked or broken any shards or splinters will remain stuck to the synthetic-resin layer, thereby holding together and creating no safety hazard.

This system has the disadvantage that such a laminate is an extremely good conductor. Thus in applications such as in a greenhouse it is necessary to provide two such laminates spaced apart in order to create an insulating dead-air space. Furthermore, in the event that such a laminate is impacted with considerable force, although a great deal of small dangerous shards are not produced, nonetheless large pieces presenting dangerous jagged edges are created. What is more, as it is necessary for the two glass sheets sandwiching the synthetic-resin layer to have a certain thickness in order to give adequate strength to the finished product, the prior-art laminate is quite heavy per unit of surface area and is relatively expensive. Yet another disadvantage is that if a so-called obscure glass is desired, that is one which lets all the light pass but which multiply refracts the image to break it up, it is necessary to texture the outer surface of the safety glass, thereby creating a unsmooth surface that becomes dirty quite easily.

OBJECTS OF THE INVENTION

It is therefore an object of the present invention to provide an improved laminate.

Another object is to provide an improved type of safety glass which overcomes the above-given disadvantages, that is which has good insulating properties, which is relatively light, which is inexpensive to manufacture, and which can be readily made into an effective obscure glass with smooth outer surfaces.

SUMMARY OF THE INVENTION

These objects are attained according to the instant invention in a laminate having a glass sheet to one flat face of which are secured inner and outer synthetic-resin plates which extend parallel to but are spaced from each other by a plurality of transverse synthetic-resin webs which unitarily interconnect and space the plates and form between them a plurality of dead-air spaces. The plates and sheet are sealed together at their peripheries to close the dead-air spaces off.

According to this invention the sheet and plates are transparent so that the laminate acts as an extremely effective safety glass. The transverse synthetic-resin webs unitarily interconnecting and spacing the plates serve to break up and to refract the light passing through the laminate without appreciably diminishing the overall amount of light that goes through the laminate. The dead-air spaces will obviously impart good insulating properties to the laminate. Thus the laminate according to this invention is ideally usable in applications such as skylights and greenhouses.

If the laminate is subjected to an impact severe enough to break the glass sheet it will remain stuck to the flexible synthetic-resin plates. Thus the laminate according to this invention will be almost completely hailproof. This also makes it ideal for use in a skylight or a greenhouse.

According to further features of this invention the transverse webs, which are integrally formed with the inner and outer synthetic-resin plates, are constituted as parallel web strips extending perpendicular to the plates and defining parallel passages. These passages are sealed at their ends to form the laminate into a so-called thermal pane.

SPECIFIC DESCRIPTION

Figure 1:
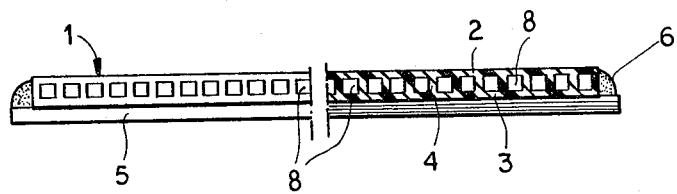
FIG. 1 is a partially sectional and partially end view of a laminate according to this invention.

A laminate according to this invention basically comprises a unitary synthetic-resin panel 1 formed of an outer plate 2, an inner plate 3, and a plurality of parallel transverse web strips 4 defining parallel voids or passages 8, and a glass sheet 5. A bead 6 of silicone extends completely around the peripheries of the panel 1 and glass sheet 5 to seal them together and to close the ends of the passages 8.

Figure 2:
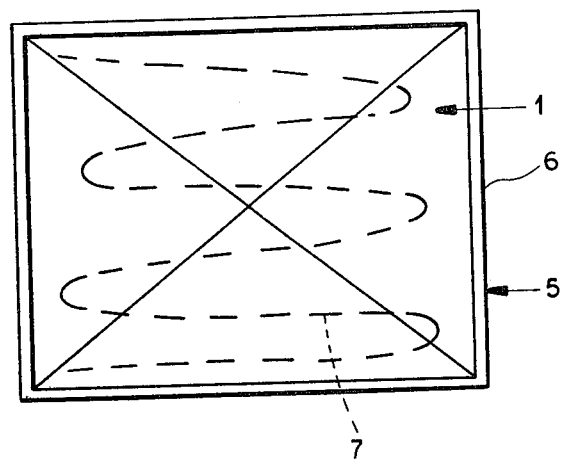
FIG. 2 is a top view of a laminate according to this invention.

The inner plate 3 is secured to the face of the sheet 5 either by a continuous film or adhesive, or spots of adhesive, or a sinusoidal bead of adhesive such as shown at 7 in FIG. 2. In this manner the entire assembly is rigid and if the sheet 5 is broken its shards will remain stuck to the panel 1.

Figure 3:
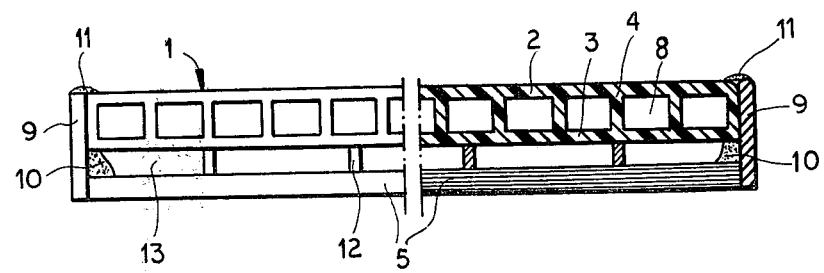
FIG. 3 is a view similar to FIG. 1 of another laminate according to this invention.

It is also possible according to this invention to space the panel 1 from the sheet 5 as shown in FIG. 3 by spacers 12. This entire assembly is then held in a frame 9, with a silicone mastic 10 sealing the periphery of the space 13 between the inner plate 3 and the sheet 5 and another bead 11 securing the panel 1 to the top edge of the frame 9.

Normally the sheet 5 is of conventional clear glass with a pair of planar shiny faces. The panel 1 is unitarily made of a synthetic-resin such as polymethylmethacrylate, polyvinylchloride, or polyethylene. Here a durable polycarbonate is used. The resultant structure will be substantially lighter than safety glass of equivalent strength and similarly will be substantially lighter than thermal-pane glass of equivalent insulating properties. Light passing through the laminate according to this invention will, admittedly, be refracted and broken up, yet nonetheless virtually all of the light will pass through the laminate, making it ideal for use in a skylight or in a greenhouse.

The spacers 12 can be either simple rods or buttons holding the panel 1 and glass 5 apart, or can be strips extending parallel to each other or even crossing one another. In any event the dead-air spaces inside the laminate according to the invention are all sealed at their edges or ends. So long as the original manufacturer takes care to ensure that clean air of very low humidity is inside these spaces 8 and 13 before they are sealed off no condensation need be expected.

I claim:

1. A light-transmitting laminate comprising:
   a transparent glass sheet having at least one flat face;
   an integral synthetic-resin panel having
      transparent inner and outer synthetic-resin plates extending parallel to but spaced from each other, and
      a plurality of transverse synthetic-resin transparent webs unitarily interconnecting and spacing said plates and forming therebetween a plurality of dead-air spaces;
   means for bonding said inner plate to said face of said glass sheet; and
   means for sealing said panel and sheet at their peripheries.

2. The laminate defined in claim 1 wherein said plates are of a polycarbonate.

3. The laminate defined in claim 1 wherein said means for bonding includes an adhesive flatly bonding said inner plate to said face of said glass sheet.

4. The laminate defined in claim 1 wherein said means for bonding includes spacers secured to and between said face of said glass sheet and said inner sheet.

5. The laminate defined in claim 1 wherein said means for sealing includes a silicone strip.

6. The laminate defined in claim 1 further comprising a frame surrounding said sheet and plates and secured thereto at said peripheries.

7. The laminate defined in claim 1 wherein said means for bonding includes a silicone adhesive.

8. The laminate defined in claim 1 wherein said webs are parallel web strips extending perpendicular to said plates and unitarily formed therewith.

9. The laminate defined in claim 8 wherein said spaces are parallel passages and said means for sealing closes the ends of said passages.

* * * * *